United States Patent [19]

Kawakami et al.

[11] Patent Number: 5,362,448
[45] Date of Patent: Nov. 8, 1994

[54] CONTINOUS POLYMERIZATION METHOD OF LAUROLACTAM AND APPARATUS THEREFOR

[75] Inventors: Atsuo Kawakami; Toshiro Shimada; Tatsuo Tsumiyama; Hisaya Yamaguchi, all of Ube, Japan

[73] Assignee: Ube Industries, Ltd., Ube, Japan

[21] Appl. No.: 134,694

[22] Filed: Oct. 12, 1993

Related U.S. Application Data

[62] Division of Ser. No. 929,404, Aug. 14, 1992, Pat. No. 5,283,315.

[30] Foreign Application Priority Data

Aug. 22, 1991 [JP] Japan .................................. 3-235361

[51] Int. Cl.$^5$ .......................... C08F 2/00; F28D 7/00; C08G 69/14
[52] U.S. Cl. .................................. 422/137; 422/134; 422/138; 422/198; 422/201; 528/326
[58] Field of Search ............... 422/134, 137, 138, 198, 422/201; 528/326, 323, 65

[56] References Cited

U.S. PATENT DOCUMENTS

| | | | |
|---|---|---|---|
| 2,964,391 | 12/1960 | Benson | 422/134 |
| 3,317,482 | 5/1967 | Kunde et al. | 528/323 |
| 3,679,368 | 7/1972 | Balint et al. | 422/134 |
| 4,343,929 | 8/1982 | Sugio et al. | 422/137 |
| 4,734,263 | 3/1988 | Gerking et al. | 422/137 |
| 4,801,433 | 1/1989 | Yamanaka et al. | 422/137 |
| 4,921,678 | 5/1990 | Raufast | 422/134 |

OTHER PUBLICATIONS

Patent Abstract of Japan; vol. 13, No. 241 (C-604) (3589) 6 Jun. 1989 & JP-A-01 051 433 (Ube Industries Limited).
Patent Abstract of Japan; vol. 6, No. 127 (C-113) (1005) 13 Jun. 1982 & JP-57 053 532 (Ube Industries Limited).
SRI Report, vol. 94, pp. 347-353 (1974).

Primary Examiner—Robert J. Warden
Assistant Examiner—Christopher Y. Kim
Attorney, Agent, or Firm—Armstrong, Westerman, Hattori, McLeland & Naughton

[57] ABSTRACT

A continuous polymerization method for laurolactam which has three stages. A prepolymerization process include steps of preliminarily heating laurolactam with 1 to 10% weight of water added, thereafter continuously feeding and passing the laurolactam from the upper part of the lower part of the longitudinal-type polymerization reaction zone, arranging a temperature decreasing gradient of 10° C. or more than the upper part to the lower part directions at a polymerization temperature of 250° and 300° C. in the polymerization zone, and polymerizing the laurolactam under vapor pressure up to a conversion rate of 99.5% or more. A intermediate process has a step of releasing pressure from the prepolymerization product from the prepolymerization process for conversion into an intermediate product at atmospheric pressure. A post polymerization process includes the steps of continuously feeding the intermediate product at atmospheric pressure from the intermediate process in the direction from one end of the lower end to the other lower end of the traverse-type polymerization zone, polymerizing the intermediate product with agitation and air discharge in the presence of inert gas under reduced pressure or atmospheric pressure to a final relative viscosity of $\eta_\tau$ of 1.9 to 3.3.

4 Claims, 1 Drawing Sheet

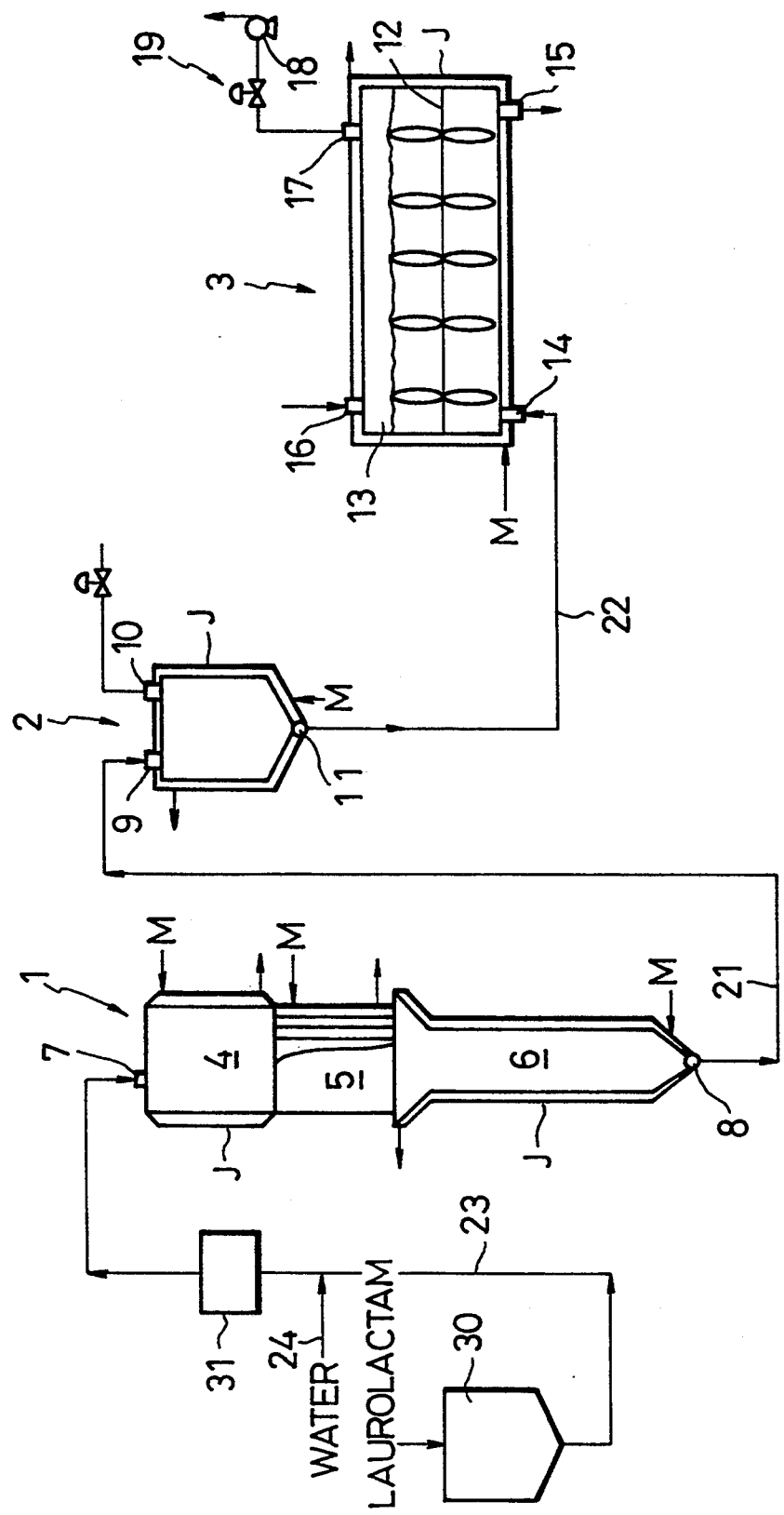

CONTINOUS POLYMERIZATION METHOD OF LAUROLACTAM AND APPARATUS THEREFOR

This is a division, of application Ser. No. 07/929,404 filed Aug. 14, 1992, now U.S. Pat. No. 5,283,315.

BACKGROUND OF THE INVENTION AND PRIOR ART STATEMENT

The present invention relates to a continuous polymerization method of laurolactam (dodecanoic lactam) and the apparatus therefor. More specifically, the present invention relates to a continuous polymerization method of laurolactam (dodecanoic lactam), comprising continuously polymerizing laurolactam as a raw material monomer by using water as a catalyst, thereby producing a desired high quality Nylon 12 with a wide range of molecular weight, and the apparatus therefor.

Nylon 12 has conventionally been produced by heating and polymerizing laurolactam (dodecanoic lactam) or 12-aminododecanoic acid. By the method using 12-aminododecanoic acid as a raw material monomer, 12-aminododecanoic acid is continuously heated and melted under atmospheric pressure for polycondensation. Alternatively, the ring opening reaction of laurolactam progresses very slowly, which rate is 1/10 or less that of the rate of hydrolysis and polymerization of relatively easily ring opening caprolactam under atmospheric pressure as a raw material of Nylon 6. Therefore, the process using laurolactam as a raw material monomer generally comprises effecting a prepolymerization process wherein laurolactam is firstly heated along with water or an acid catalyst or the like under pressure, thereby promoting the ring opening reaction following a high-temperature/high-pressure system, rendering the pressure to atmospheric pressure, and polycondensing the resulting product under atmospheric pressure or reduced pressure to prepare a high molecular weight Nylon 12.

If it is intended to produce Nylon 12 by continuous polymerization using laurolactam as a raw material monomer, a large-scale, complex apparatus for high temperatures and high pressures is therefore inevitable due to the prepolymerization process, causing problems such as high equipment cost. Thus, a batch polymerization system (discontinuous two-step polymerization system) has conventionally been employed primarily for industrial polymerization of laurolactam.

However, such a batch system has the following drawbacks; the operational procedure is complex with a low productivity; when drawing out a generated polymer after the termination of the post polymerization process, the adhesion of the generated polymer onto the polymerization vessel and the retention thereof in the vessel is unavoidable; if the prepolymerization and post polymerization are repeated in the same container, the residual polymer is deteriorated through thermal hysteresis, thereby reducing the quality of the product polymer. In order to prevent these drawbacks, the vessel should necessarily be washed periodically, resulting in a far lower productivity.

In producing Nylon 12 having a high polymerization degree from laurolactam as the raw material monomer, the most serious problem in either one of the continuous polymerization or the batch polymerization is a laurolactam polymerization-conversion rate at the prepolymerization process under pressure. For the ring opening polymerization of laurolactam, the conversion rate obtained by the prepolymerization process influences the final polymerization product. While the prepolymerization process is conducted under pressure, the procedures in the prepolymerization process thereafter are conducted under atmospheric pressure or reduced pressure, and because it cannot be expected to increase the conversion rate at the prepolymerization process by a much greater degree though it is sometimes possible that the rate slightly increase. If the prepolymerization process is insufficient, disadvantages may develop such as the occurrence of contamination of a nozzle or a mold during the molding process, so it is important for laurolactam polymerization that the polymerization-conversion rate (ring opening reaction) at the prepolymerization process under pressure should be facilitated to a nearly equilibrium value (about 99.7%).

In order to promote the conversion rate at the prepolymerization process up to at the equilibrium value in such case, water conventionally employed as a single catalyst is generally added to laurolactam at 1 to 10% by weight under a pressure of about 10 to 50 kg/cm$^2$G and a higher temperature above 300° C. But at a higher temperature above 300° C., thermal deterioration, namely, partial gelation or discoloring or the like, is likely to occur due to the occurrence of undesirable secondary reactions, so that a high-quality polymer cannot be obtained. At a temperature below 300° C., alternatively, a prepolymerization time period of at least 10 hours or more is required, resulting also in the deterioration of the quality of a polymer due to the factor of thermal deterioration via a prolonged polymerization at a high temperature and a high pressure.

If the water addition rate is less than 1% by weight, the ring opening polymerization of laurolactam is extremely difficult to occur, whereby the polymerization addition rate is lowered. On the other hand, if above 10% by weight, the dehydration from a reaction product occurs involving bubble, so that the plug flowability of a reaction solution inside a reaction column is lowered, resulting in the variation of the conversion rate, unfavorably.

Furthermore, when intending a high conversion rate by a prepolymerization at a temperature below 300° C. and for 10 hours or less, acid or alkali catalysts are required besides water. When these catalysts are used, the molecular weight is hard to adjust at post polymerization, and hence, it is difficult to obtain a Nylon 12 with a desired molecular weight. Also, the viscosity change and the like at the molding process (at remelting) are remarked as problems, so that the industrial practice thereof is difficult.

As has been described above, the method comprising continuously polymerizing laurolactam employing water as a catalyst thereby industrially producing a high-quality Nylon 12 with a predetermined molecular weight has a variety of problems, so further improvement thereof has been desired.

It is the object of the present invention to overcome the problems in polymerizing laurolactam as a raw material monomer, and to provide a method for continuous polymerization of laurolactam, comprising industrially producing a high-quality Nylon 12 with a desirable molecular weight at a lower polymerization temperature and for an extremely short period of time, and the apparatus therefor.

SUMMARY OF THE INVENTION

In accordance with the present invention, a continuous polymerization method of laurolactam is provided, comprising a prepolymerization process comprising preliminarily heating laurolactam with water added at 1 to 10% by weight to a temperature of the upper part of an upper reaction zone, thereafter continuously feeding and passing the laurolactam from the upper part to the lower part of a longitudinal-type polymerization reaction zone, simultaneously arranging a temperature decreasing gradient of 10° C. or more from the upper part to the lower part directions at a polymerization temperature of 250° to 300° C. in the reaction zone, and effecting polymerization at a conversation rate of 99.5% or more under pressure. An intermediate process comprising releasing the pressure from the prepolymerization product from the prepolymerization process thereby preparing an intermediate product in a state of atmospheric pressure, and a prepolymerization process comprising continuously feeding the intermediate product from the intermediate process from one lower end of the transverse polymerization zone elongated in horizontal direction to the other lower end thereof, agitating and degassing the intermediate product in the presence of inert gas at a polymerization temperature of 220° to 280° C. under reduced pressure or under atmospheric pressure to progress the polymerization to a relative viscosity ($\eta_r$) of 1.9 to 3.3.

Also, a continuous polymerization apparatus of laurolactam is provided, comprising (a) a prepolymerization column of a longitudinal reaction column comprising an upper part zone, an intermediate part zone and a lower part zone, the upper part zone having a laurolactam feed inlet and the lower part zone having a product discharge outlet, the intermediate zone being of a shell-tube type heat exchanging structure and a rectifying mechanism being arranged on the lower zone; (b) an intermediate vessel of a longitudinal reaction vessel having a feed inlet of and an air discharge outlet of the prepolymerization product at the upper part thereof end and having the discharge outlet of the intermediate product at the lower part thereof; (c) a prepolymerization vessel of a transverse reaction vessel having the feed inlet of the intermediate product at one end of the lower part and having the discharge outlet of the polymerization product at the other end thereof, and having gas feed inlet and gas discharge outlet at the upper part, and arranging therein an agitation mechanism rotating around a center of a substantially horizontal axis therein, wherein a pipe is arranged in between the product discharge outlet of the prepolymerization column and the prepolymerization product feed inlet of the intermediate vessel, and a pipe is arranged in between the intermediate product discharge outlet of the intermediate vessel and the intermediate product feed inlet of the prepolymerization vessel.

The term "conversion rate (%)" refers to the percentage by weight of an extracted residue in a reaction product, the residue being obtained by extracting the reaction product in boiling methanol and removing an extractable part of unreacted laurolactam in its entirety.

The method for producing a high-quality Nylon 12 having a high molecular weight by continuously polymerizing laurolactam and the apparatus therefor in accordance with the present invention are constituted as described above, which are continuously operated in three processes of the prepolymerization process, the intermediate process and the post polymerization process, and by specifically defining the water addition rate to laurolactam and the conditions of the inner temperature at the prepolymerization process, in particular, the prepolymerization under pressure can be done at a temperature below 300° C., lower than conventionally employed temperatures, and furthermore, a prepolymerization product with a higher conversion rate can be obtained for a far shorter period of time than conventional ones.

Then, through the intermediate process comprising pressure releasing the prepolymerization product into atmospheric pressure, heating and melting is immediately done under atmospheric pressure or under reduced pressure for polycondensation, at the post polymerization process, while discharging water as a by-product thereby effecting polycondensation, the objective Nylon 12 can continuously be obtained.

By giving a temperature decreasing gradient of 10° C. or more by gradually decreasing the polymerization temperature at the prepolymerization process from the upper part to the lower part directions and simultaneously preliminarily heating and feeding the mixed solution with a water catalyst added, up to the liquid temperature of the upper part at the prepolymerization process, the convection of the upper part liquid and the convection during the whole prepolymerization process are prevented to improve plug flowability, and thus, a high conversion rate can be accomplished at a polymerization temperature of 300° C. or less for a short period of time.

Furthermore, the apparatus of the present invention is an apparatus for the continuous polymerization method of laurolactam, and in the prepolymerization column having three part zones in vertical direction, the intermediate part zone is constituted of a shell-tube type heat exchanging structure and a rectifying mechanism is arranged at the lower part zone, whereby the convection of the reaction solution is prevented during the prepolymerization process to increase the conversion rate of laurolactam. In the post polymerization vessel, alternatively, an agitation mechanism having agitation wings arranged on a horizontal rotation axis are arranged in the post polymerization vessel, thereby contacting the reaction solution to a space (head space) retained in the upper part by stirring the polymerization product up and down to release the water secondarily produced through the polycondensation reaction as vapor, whereby laurolactam is continuously polymerized by using a water catalyst to generate a high-quality Nylon 12 having a wide range of desired high molecular weights under control.

BRIEF DESCRIPTION OF THE DRAWING

FIG. 1 shows an explanatory view of one embodiment of the continuous polymerization apparatus so as to practice the continuous polymerization method of the present invention.

DETAILED DESCRIPTION OF PREFERRED EMBODIMENTS

Embodiments of the present invention will now be explained in details with reference to attached drawings hereinbelow. However, the present invention will not be limited to the following examples.

FIG. 1 depicts an explanatory view of one embodiment of the continuous polymerization method and apparatus therefor in accordance with the present invention.

In FIG. 1, longitudinal-type prepolymerization column 1 comprises three part zones of upper part zone 4, intermediate part zone 5 and lower part zone 6, wherein feed inlet 7 of laurolactam as a raw material monomer is arranged at the upper part zone 4 and prepolymerization product discharge outlet 8 is arranged at the lower part zone 6. On the circumferential walls of The upper part zone 4 and the lower part zone 6 are arranged separately heating jackets J, J, each having a heat transfer medium M feed inlet and a heat transfer medium M discharge outlet. Intermediate part zone 5 of the prepolymerization column 1 is of a shell-tube type heat exchanging structure wherein the reaction product passes through the inside of the tube and a heat transfer medium M passes through the shell thereof. A rectifying mechanism is arranged in the inside of the lower part zone 6 extending from the bottom of the intermediate part zone to the product discharge outlet 8, and a rectifier (static mixing element) or a rectifying plate (jingasa; strong metallic headpiece), for example, may be charged therein. At the upper part of the prepolymerization column 1 thus constituted, an air outlet is generally arranged, but the prepolymerization column 1 is generally sealed during the polymerization so that the prepolymerization process is maintained under pressure through the vapor pressure via the water content in the polymerization catalyst.

In the intermediate vessel 2, prepolymerization product feed inlet 9 and air outlet 10 are arranged on the upper part thereof and intermediate product discharge outlet 11 after pressure-release is arranged on the lower part thereof, and a heat transfer medium jacket j provided with a heat transfer feed inlet and a heat transfer discharge outlet is arranged on the outer circumferential wall.

Post polymerization vessel 3 has a nearly cylindrical form transversely arranged in transverse direction, and inside the vessel is arranged agitation mechanism 12 of a polymer melt which mechanism can rotate around an axis extending substantially in a horizontal direction. The agitation mechanism 12 can be any of those if they can agitate the polymer melt in the vessel without dead space, and preference is given to those provided with a single-axial or plural-axial (for example, biaxial) agitation wings transferable in contact to the wall of the vessel bottom. As the agitation wing, any one of those having a wing rotatable and transferable along the vessel bottom, and those of control-type, taper-roll type, screw type, spiral tube type, circular plate type and the like are illustratively used. Among them, preference is given to those in the form with no possible occurrence of the reverse mixing of the polymer melt. Head space 13 is retained in the upper part of the post polymerization vessel 3, after intermediate product from the intermediate vessel is contained in melting state inside the post polymerization vessel 3.

Feed inlet 14 of the intermediate product in a melted state is arranged on one end part in transverse direction of the post polymerization vessel 3, for example in the bottom part of the left-side end part, while polymerization product discharge outlet 15 of Nylon 12 at a high polymerization degree as a final product is arranged on the bottom part of the right-side end part. On the polymerization product discharge part 15 is arranged a gear pump driven by a motor, whereby the final product Nylon 12 can be drawn outside.

In the post polymerization vessel 3 is arranged gas feed inlet 16 of inert gas such as nitrogen, which communicates with one end part of the head space 13 in the upper part, while on the other end thereof is arranged gas discharge outlet 17 inert gas and vaporized water, which communicates through pressure adjusting valve 19 with vacuum pump 18. Furthermore, heating jacket J for heating the prepolymerization product in the vessel to a high temperature thereby continuing the post polymerization is arranged on the outer circumferential wall of the post polymerization vessel.

Pipe 21 is arranged between the product discharge outlet 8 of the prepolymerization column 1 and the prepolymerization product feed inlet 9 of the intermediate vessel 2, and on the pipe 21 is arranged a gear pump driven by a motor to transfer the prepolymerization product to the intermediate vessel 2. Also, pipe 22 is arranged between the intermediate product discharge outlet 11 of the intermediate vessel 2 and the intermediate product feed inlet 14 of the post polymerization vessel 3, and on the pipe 22 is arranged a gear pump driven by a motor, to transfer the intermediate product to the post polymerization vessel.

Heating jackets are arranged around these pipes and gear pumps, so as to maintain the transferred polymerization product and the like in a melted state.

Explanation will follow concerning the laurolactam continuous polymerization method by the continuous polymerization apparatus constituted as described above.

In the apparatus of FIG. 1, a raw material laurolactam is heated in container 30, and the melted laurolactam is measured with a quantitative pump to a predetermined feed rate, and transferred into raw material feed pipe 23. On the other hand, water as a catalyst is adjusted to a preset flow rate with a quantitative pump, which is then transferred through pipe 24 into the inside of raw material feed pipe 23. Laurolactam is mixed with water in the raw material feed pipe 23, and preliminarily heated with a preheater 31 to the liquid temperature of the upper part of the prepolymerization column, for example, about 260° to 300° C., which is then fed from laurolactam feed inlet 7 into the inside of the sealed prepolymerization column 1.

The raw material laurolactam fed into the upper part zone 4 inside the column can maintain the feeding temperature thereof by the heating jacket on the outer circumference for a predetermined retention time period, and then moves from the upper part zone to the intermediate part zone 5, where the laurolactam is given the reaction heat for ring opening by a heat transfer medium passing through the shell side of the shell-tube type heat exchanging structure, and the ring opening reaction is terminated up to 90% or more and the resulting product then flows naturally from the middle part zone 5 of the prepolymerization column to the lower part zone 6 thereof. At the lower part zone 6 is charged and arranged a rectifying mechanism, for example, a rectifier (static mixing element) and a rectifying plate (jingasa; strong metallic headpiece), and by feeding a heat transfer medium to the heating jacket J on the outer circumference, regulation is done in order to decrease the polymer solution temperature of the lower part zone by 10° to 30° C. lower than the temperature of the upper part zone. By arranging a temperature decreasing gradient on the upper, intermediate and lower part zones of the prepolymerization column, thereby preventing as much as possible the mixing of the polymer solution in up and down direction, and effecting ring opening polymerization while streaming down the polymer solution as a plug flow stream, the polymerization conversion rate of laurolactam is facilitated to an equilibrium value of about 99.7%.

In the ring opening polymerization of prepolymerized laurolactam in accordance with the present invention, the addition rate of water as the catalyst is 1 to 10%, preferably 3 to 8% by weight to laurolactam which is the same as the known addition amount.

The prepolymerization temperature is 250° C. or higher preferably 250° to 300° C., specifically preferably 270° to 290° C., and the temperatures of the heat transfer medium in the heating jackets on the outer circumferential part in the upper and lower part zones and in the shell side of the shell-tube type heat exchanging structure are controlled in order that a temperature gradient of about 10° to 30° C., preferably 15° to 25° C., might be arranged by maintaining the upper part zone of the column top at the maximum temperature and decreasing the temperature in the down direction.

The prepolymerization is preferably done in a state under pressure via reaction vapor pressure at a high temperature, specifically water vapor pressure of the water content as the catalyst, while keeping the prepolymerization column in a sealed state, and it is preferred to keep the pressure of the vapor phase part in the column top at about 20 kg/cm$^2$G or more, preferably at 30 to 40 kg/cm$^2$G. Under the conditions described above, the polymerization period required for prepolymerization is generally 5 to 10 hours.

In accordance with the present invention, the reaction conversion rate of laurolactam during prepolymerization is preferably set at 99.5% or more. If less than 99.5%, such conversion rate causes contamination of molds and nozzles during molding of final products as described above. The polymerization degree of the prepolymerization product in the case of the conversion rate of 99.5% is satisfactorily at about 1.6 or less, preferably 1.4 to 1.6 in relative viscosity ($\eta_r$), and generally 5,000 to 9,500 in number average molecular weight. By the term "relative viscosity ($\eta_r$)" is meant a viscosity of 1% solution in 98% sulfuric acid measured at a temperature of 25° C.

The prepolymerization product which reaches the bottom part of the prepolymerization column 1 is drawn out in a melted state from the product discharge outlet 8, and is fed with a gear pump through the pipe 21 and the prepolymerization product feed inlet 9 arranged on the upper part of the intermediate vessel 2 into the inside of the intermediate vessel 2. In the intermediate vessel 2, the inner polymerization product temperature is maintained about 240° C. or higher, preferable at about 240° to 280° C., more preferably at about 250° to 270° C., by the heat transfer medium fed into the inside of the heating jacket J.

In the intermediate vessel 2 in accordance with the present invention, water vapor is atmospherically released from the prepolymerization product under pressure, whereby the prepolymerization product is prepared into the state of atmospheric pressure, so that the intermediate vessel 2 is operated in the state of vacant vessel with no retention time period and the pressure-release intermediate product from the prepolymerization product is drawn out of the intermediate product discharge outlet 11 of the bottom part. In passing through the intermediate vessel, polymerization progresses mildly, but the polymerization degree at the intermediate product discharge outlet 11 is controlled to about 1.8 or less, preferable to 1.6 to 1.8 in terms of $\eta_r$.

The intermediate product drawn out from the discharge outlet 11 is fed with a gear pump from the intermediate product feed inlet 14 arranged at the bottom part of one end part of the post polymerization vessel 3 through the pipe 22 to the inside of the postpolymerization vessel 3. The post polymerization vessel 3 is heated by the heat transfer medium fed inside the heating jacket on the outer circumference of the post polymerization vessel 3, so that the temperature of the polymerization product in the center might be about 270° C. or lower, preferably about 220° to 270° C., and more preferably about 245° to 265° C. The inner polymerization product is brought up by the rotation of agitation wings arranged on a horizontally rotating axis of agitation mechanism 12 along the bottom wall of the post polymerization vessel, thereby reaching the interface in contact with head space 13, and then, the reaction-generating water which is generated by the polycondensation in the postpolymerization is vaporized inside the head space 13.

Water vapor released into the head space is drawn out through gas discharge outlet 17 outside the vessel. In such case, by adjusting the pressure inside the vessel to 100 to 760 mmHg, depending on a predetermined relative viscosity of the post polymerization product and by controlling vacuum pump 18 and pressure adjusting valve 19, which are arranged outside the vessel, inert gas such as nitrogen, transferred from gas feed inlet 16 into the head space, and the water vapor in the reaction-generating water are discharged outside the vessel. Because the water content in the melt polymer phase is removed simultaneously with the polycondensation, post polymerization readily progressed to obtain a melt product of Nylon 12.

The agitation mechanism to be used preferably in the post polymerization vessel functioning as has been described above in accordance with the present invention includes those of agitation type, being provided with agitation wings having two parallel axes arranged in horizontal direction, wherein the polymer melt passes through the central part of the vessel and is transferred to the interface in contact with the head space, and then, the polymer melt passes through the side part of the vessel to be transferred to the bottom part of the vessel. That is, two shafts of agitator are arranged in parallel at intervals in transverse direction, each shaft being provided with a plurality of agitation wings, one shaft a rotating outwardly in clockwise direction in relative to the other shaft b rotating outwardly in anti-clockwise direction, agitation wings a' and b' of the shaft a being arranged so that the phase angles thereof are different by 90° from each other. By such constitution, the bringing up of the polymer melt to the head space can be generated at a frequency corresponding to the frequency of each agitation wing, per one rotation of the shaft a (shaft b), whereby the secondarily produced water content can efficiently be removed following the progress of the polycondensation into Nylon 12.

The polymer melt inside the post polymerization vessel 3 while repeatedly making up and down movement from the bottom part of the vessel to the head space 13 as has been described above, is removed of its water simultaneously with the progress of post polymerization, and due to the flowability of the polymer melt of itself, the polymer melt is concurrently transferred, at a volume corresponding to the volume of the intermediate product fed from the feed inlet 14, into the horizontal direction of the vessel, namely in transverse direction toward the polymerization product discharge outlet 15. Post polymerization product is discharged from the discharge outlet 15 outside the vessel.

Generally, the time period required for post polymerization is appropriately about 1.5 to 4.5 hours. By appropriately adjusting the polymerization period, vapor-phase pressure, temperature and the like in the post polymerization process, the relative viscosity of the post polymerization product can be adjusted in a range of 1.9 to 3.3. In case of producing a polymerization product with a low relative viscosity, for example, post polymerization may satisfactorily be done in a lower polymerization temperature range under atmospheric pressure for a short period. In this case, there can be obtained a desired Nylon 12 with a high molecular weight generally in a wide range of number average molecular weight of about 15,000 to 40,000.

(EXAMPLE 1)

By using the continuous polymerization apparatus shown in FIG. 1, continuous polymerization of laurolactam was done.

The inner diameter of the prepolymerization column 1 was 300 mm at the upper part zone 4 and the intermediate zone 5, and 125 mm at the lower part zone 6, while the total inner height thereof was 3000 mm and the total inner volume was 80 liter. The volume of the upper part zone of the prepolymerization column 1 was 35 liter (operational volume, 15 liter); the volume of the intermediate zone of the shell-tube type heat exchanging structure was 10 liter; and the volume of the lower part was 35 liter. Also, a rectifier was charged on the lower part zone.

The inner diameter of the intermediate vessel 2 was 200 mm, and the total inner height was 650 mm. The inner diameter of the post polymerization vessel 3 was 470 mm, and the inner length was 630 mm. The agitator had 12 agitation wings in the form of an infinity sign.

By defining the content retained in the prepolymerization column 1 at about 60 liter and maintaining the liquid face of the reaction product by about 250 mm above the upper top of the shell-tube type heat exchanging structure of the intermediate zone 5, melt laurolactam of 7 kg/hr and water of 0.35 kg/hr were mixed together and then preliminarily heated to 295° C. in preliminarily heating chamber 31, which was subsequently fed continuously from laurolactam feed inlet 7 into the prepolymerization column 1.

Individual circulation of a heat transfer medium at about 300° C. and a heat transfer medium at about 285° C. was done in the heating jacket on the upper part zone and the part of shell-tube type structure of the intermediate part zone and in the heating jacket on the lower part zone, respectively, so as to maintain the temperature and pressure of the vapor phase of the prepolymerization column at 270° C. and 35 atm and to maintain the temperature of the liquid phase (content) of the prepolymerization column at 295° C. at the upper part, 282° C. at the central part of the intermediate part, and 275° C. at the lower part.

In such manner as described above, laurolactam was polymerized by maintaining the retention time inside the prepolymerization column 1 at about 7 hours, and then, the prepolymerization product was drawn out from the prepolymerization product discharge outlet 8 at a rate of 7.35 kg per one hour by adjusting the rotation number of a gear pump. The remaining laurolactam content in the prepolymerization product was 0.3% (conversion rate: 99.7%). The relative viscosity was 1.47 (number average molecular weight: 7,000).

Similarly, the prepolymerization product was fed at a rate of 7.35 kg/HR through the transfer pipe 21 to the intermediate vessel 2, and water vapor was released into atmosphere from the upper part air discharge outlet 10 to realize atmospheric pressure. A heat transfer medium at about 270° C. was circulated in the heating jacket on the outer circumference in order that the temperature of the contents in the intermediate vessel might be 258° C.

With a gear pump, the intermediate product in the state of atmospheric pressure was drawn out from the intermediate product discharge outlet 11 without taking retention time. The relative viscosity of the intermediate product was 1.64 (number average molecular weight: 10,100).

At a rate of 7 kg/HR, the intermediate product was fed through the transfer pipe 22 to the post polymerization vessel 3, While continuously discharging Nylon 12 as the polymerization product from the polymerization product discharge outlet 15, conditioning was done so as to maintain the volume of the polymer inside the post polymerization vessel at about 16 kg and form head space 13 at the upper part. The temperature of the polymer melt inside the post polymerization vessel was adjusted to 255° C. by passing a heat transfer medium at about 270° C. through the heating jacket. Furthermore, vacuum pump 18 and pressure adjusting valve 19 were conditioned and driven, and while removing water vapor secondarily produced following polymerization through gas discharge outlet 17, the pressure of the vapor phase in the post polymerization vessel was adjusted 760 mmHg (atmospheric pressure). The shafts of agitation were rotated at 10 rpm.

By such manner as described above, Nylon 12 as the polymerization product drawn out with a gear pump from the polymerization product discharge outlet 15 had a residual laurolactam content of 0.3% (conversion rate: 99.7%), a relative viscosity of 2.20 (number average molecular weight: 20,100), and a melting point of 178° C.

(EXAMPLE 2)

Except that the pressure in the vapor phase in the post polymerization vessel was adjusted to 150 mmHG, all conditions were the same as in Example 1.

The Nylon 12 obtained had a residual laurolactam content of 0.2% (conversion rate: 99.8%), a relative viscosity of 3.30 (number average molecular weight: 39,700), and a melting point of 178° C.

(Comparative Example 1)

As in Example 1, prepolymerization was done for a retention time period of 8 hours by feeding the mixture solution of laurolactam and water into the prepolymerization column at a temperature of 165° C. without preliminary heating to the liquid temperature of the upper part inside the prepolymerization column, and setting additionally the temperature of the liquid phase inside the column to a fixed temperature of 280° C. from the upper part to the lower part.

Consequently, the temperature and pressure of the vapor-phase of the prepolymerization column was 255° C. and 35 kg/cm$^2$G, respectively. The residual laurolactam content and the relative viscosity in the prepolymerization product were 3.6% (conversion rate: 96.4%) and 1.36 (number average molecular weight: 5,100), respectively.

(Comparative Example 2)

As in Example 1, prepolymerization was done for a retention time period of 8 hours as in Example 1, by feeding the mixture solution of laurolactam and water into the prepolymerization column at a temperature of 280° C. with preliminary heating to the liquid temperature of the upper part inside the prepolymerization column, and setting the temperature of the liquid phase inside the column to a fixed temperature of 280° C. from the upper part to the lower part, without arranging a temperature gradient in the temperature of the liquid phase part inside the column, as in Comparative Example 1.

Consequently, the temperature and pressure of the vapor-phase part of the prepolymerization column was 265° C. and 35 kg/cm²G, respectively. The residual laurolactam content and the relative viscosity in the prepolymerization product were 2.5% (conversion rate: 97.5%) and 1.41 (number average molecular weight: 6,000), respectively.

According to the present invention, a high-quality Nylon 12 having a predetermined molecular weight can be obtained, by effecting the laurolactam polymerization in three processes comprising a prepolymerization process comprising arranging a temperature decreasing gradient in down direction to assure a plug flow stream thereby completing the ring opening reaction in sealed state under pressure, an intermediate process comprising effecting pressure-release to realize atmospheric pressure, and a post polymerization process comprising releasing water as byproducts under atmospheric pressure or reduced pressure for polycondensation into a high molecular weight. In the prepolymerization, furthermore, the polymerization-conversion rate of laurolactam can be completed up to the equilibrium value at a polymerization temperature of 300° C. or lower for an extremely short period, by preliminarily heating the mixture solution of laurolactam and water up to the liquid temperature in the upper part inside the prepolymerization column which mixture solution is then fed into the prepolymerization column, and arranging the temperature decreasing gradient of 10° to 30° C. from the upper part to the lower part of the polymer solution inside the column; even if the polymerization product is an extremely viscous melt product, water secondarily generated by polycondensation can be vaporized and removed effectively into the head space in the post polymerization process, by using a transverse-type post polymerization vessel provided with an agitation mechanism rotating around the center of a horizontal axis, whereby a high-quality Nylon 12 can be prepared, having a wide range of molecular weight, and therefore, the present invention is extremely useful industrially.

Still furthermore, the apparatus can be relatively easily designed and constructed, and has an advantage in that the transfer of the polymerization product can be facilitated smoothly sequentially from a zone at a lower polymerization degree to a zone at a higher polymerization degree without reverse mixing, by continuously drawing out the prepolymerization product of laurolactam obtained in the prepolymerization column with no retention time required in the intermediate vessel due to the pressure-release to atmospheric pressure, immediately drawing out thereafter the product from the discharge outlet of the lower part of the intermediate vessel, feeding the resulting product into one end of the lower part of the transverse-type post polymerization vessel provided with the agitation mechanism thereby drawing out the final product from the other end of the lower part via the flowability of the polymer of itself.

What is claimed is:

1. A continuous polymerization apparatus for laurolactam comprising
   (a) a prepolymerization vertical reaction column comprising an upper zone, an intermediate zone and a lower zone, the upper zone having a laurolactam feed inlet and the lower zone having a product discharge outlet, the intermediate zone having a shell-tube heat exchanging structure and a rectifying mechanism being arranged in the lower zone;
   (b) an intermediate vertical reaction vessel having a prepolymerization product feed inlet and an air discharge outlet at an upper part thereof and having a discharge outlet for the intermediate product at a lower part thereof; and
   (c) a post polymerization horizontal reaction vessel having a feed inlet of the intermediate product at one end of a lower part and having a discharge outlet a for the polymerization product at the other end thereof, and having a gas feed inlet and a gas discharge outlet at the upper part, and provided therein an agitation mechanism rotatable around a center of a substantially horizontal axis therein,
   wherein a pipe is arranged between the product discharge outlet of the prepolymerization column and the prepolymerization product feed inlet of the intermediate vessel, and a pipe is arranged between the intermediate product discharge outlet of the intermediate vessel and the intermediate product feed inlet of the post polymerization vessel,
   and wherein said prepolymerization vertical reaction column further comprises means for maintaining a 10°–30° C. temperature differential between said upper zone and said lower zone, such that said upper zone is maintained at a higher temperature than said lower zone.

2. A continuous polymerization apparatus for laurolactam according to claim 1, wherein the agitation mechanism has two agitation shafts arranged in parallel at intervals in the transverse direction, each shaft being provided with a plurality of agitation wings, first shaft rotatable in clockwise direction in relation to a second shaft rotatable outwardly in anti-clockwise direction, said agitation wings of the first shaft being arranged so that the phase angles thereof are different by 90° from each other.

3. The continuous polymerization apparatus of claim 1, wherein said means for maintaining a 10°–30° C. temperature differential comprises a first heating jacket located on circumferential walls of said upper zone, and a second heating jacket located on circumferential walls of said lower zone, with each of said jackets having a heat transfer medium feed inlet and a heat transfer medium discharge outlet.

4. The continuous polymerization apparatus of claim 1, further comprising means for preheating laurolactam to the temperature of said upper zone of said prepolymerization vertical reaction column, said preheating means being located upstream of said prepolymerization vertical reaction column.

* * * * *